Jan. 26, 1943. H. C. BORISCH 2,309,570
SEAT CUSHION
Filed Oct. 18, 1940 3 Sheets-Sheet 1

INVENTOR.
HENRY C. BORISCH
BY Carl J. Barbee
his ATTORNEY.

Jan. 26, 1943. H. C. BORISCH 2,309,570
SEAT CUSHION
Filed Oct. 18, 1940 3 Sheets-Sheet 2
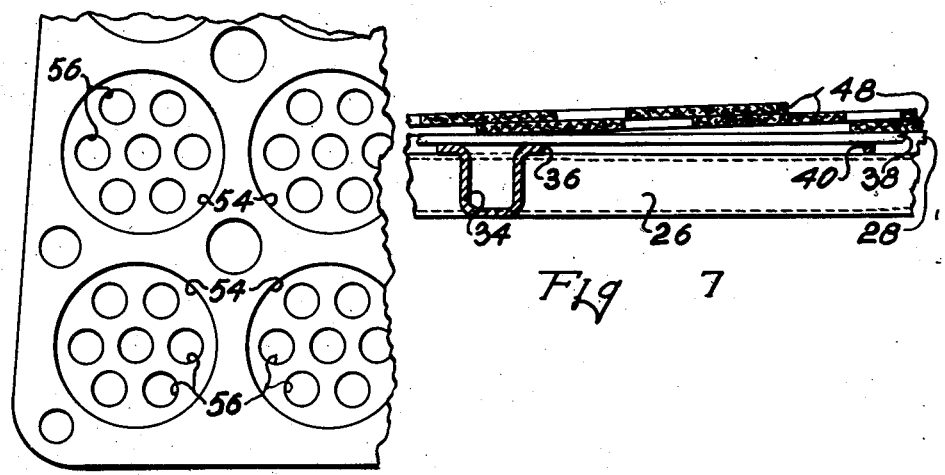
Fig 6
Fig 7
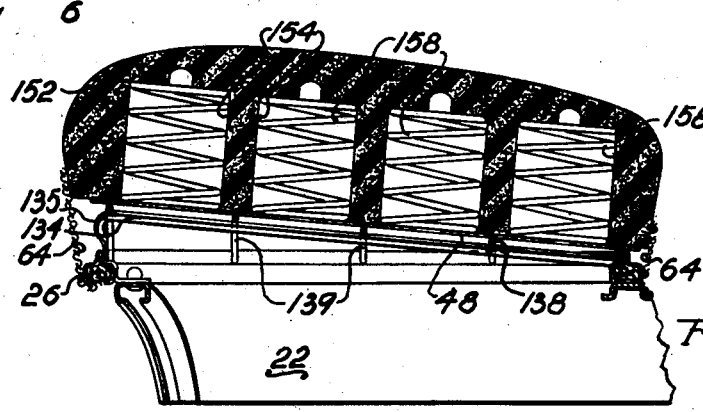
Fig 8
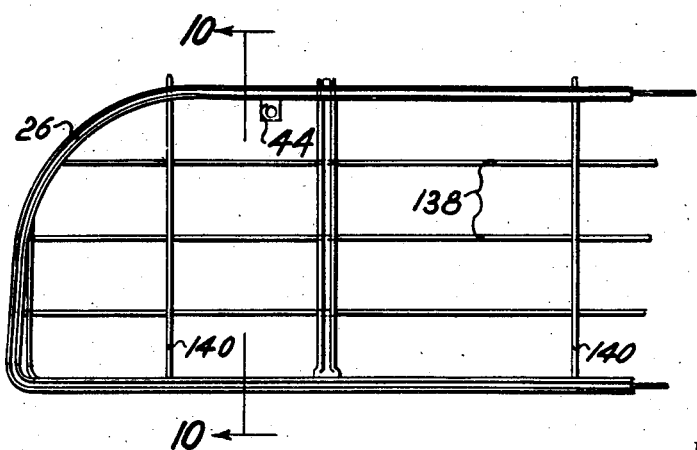
Fig 9
INVENTOR.
HENRY C. BORISCH
BY Carl J. Barbee
his ATTORNEY.

Jan. 26, 1943. H. C. BORISCH 2,309,570
SEAT CUSHION
Filed Oct. 18, 1940 3 Sheets-Sheet 3
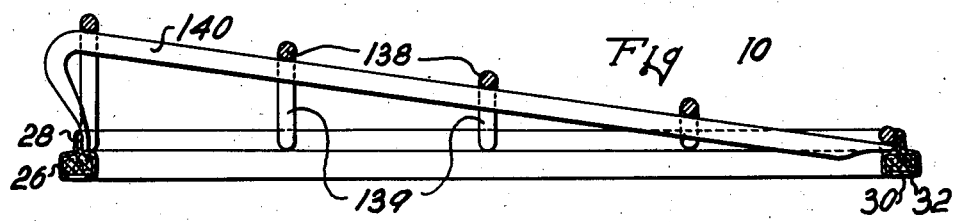
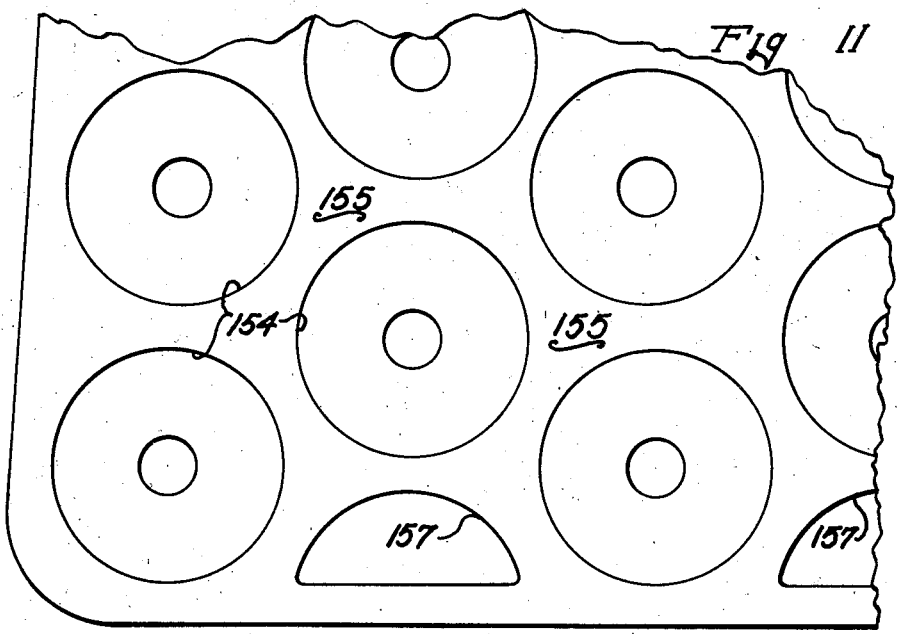
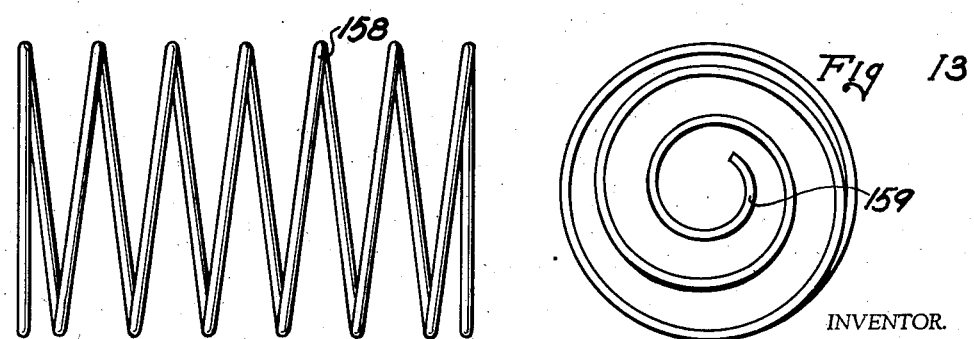
INVENTOR.
HENRY C. BORISCH
BY Carl J. Barbee
his ATTORNEY.

Patented Jan. 26, 1943

2,309,570

UNITED STATES PATENT OFFICE 2,309,570

SEAT CUSHION

Henry C. Borisch, Milwaukee, Wis., assignor to Nash-Kelvinator Corporation, Kenosha, Wis., a corporation of Maryland Application October 18, 1940, Serial No. 361,680

7 Claims. (Cl. 155—179)

This invention relates to seat cushions and has particular reference to a cushion for an automobile seat.

It is an object of this invention to provide a cushion in which sponge rubber padding functions both to pad and retain springs of the cushion.

It is another object of this invention to provide a cushion, the stiffness of which may be easily adjusted.

It is another object of this invention to provide a cushion which requires no complicated spring assembly.

It is another object of this invention to provide a cushion having main load carrying springs which are padded by material which is itself resilient.

It is another object of this invention to provide a cushion which will be lighter than cushions known heretofore.

Other objects and advantages of this invention will be apparent from a consideration of the following description and claims and attached drawings of which there are three sheets and in which—

Figure 6 represents a bottom plan view of a portion of the pad illustrated in Figures 2 and 3;

Figure 7 represents a sectional view taken along a plane indicated by the line 7—7 in Figure 2 and looking in the direction of the arrows;

Figure 8 represents a view similar to Figure 2 but illustrating a modified type of cushion;

Figure 9 represents a bottom plan view of the frame illustrated in Figure 8;

Figure 10 represents a sectional view taken along a plane indicated by the line 10—10 in Figure 9 and looking in the direction of the arrows;

Figure 11 represents a bottom plan view of a portion of the pad shown in Figure 8;

Figure 12 represents a side elevation of one of the springs shown in Figure 8; and Figure 13 represents an end elevation of the spring shown in Figure 12.

There has recently been developed a sponge rubber material which is soft, resilient and relatively porous so as to allow air to pass therethrough. This sponge rubber has been used as padding on automobile seats in place of the older fabric padding and upholstery. However, the sponge rubber padding has been applied only over the old type of spring assembly which is both heavy and expensive to construct. This invention provides a pad of sponge rubber which is reenforced by coil springs. The pad not only functions to cover the ends of the coil springs, but also retains the springs in place without the use of tie wires or clips. While the invention is disclosed as being applied to the seat portion, as distinguished from the back of an automobile seat, it will be understood that the invention may also be applied to the back cushion of a seat and to furniture generally, and is not limited to automotive use.

Figure 1:
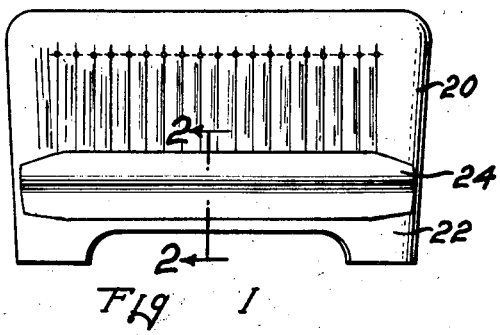
Figure 1 represents a front elevation of an automobile seat.

Shown in Figure 1 is an automobile seat having a back 20 supported by a riser 22 which is arranged to be mounted in an automobile in the usual manner. Supported upon the riser 22 is a seat cushion generally indicated at 24.

More specifically, a cushion 24 consists of a frame 26 which is generally rectangular in outline and extends around the bottom of the cushion 24. The frame 26 is generally channel-shaped in cross section, being open at its under side and provided with an upwardly extending rib 28 on its upper side. A strip of nailing material 30 is retained within the channel-shaped cross section of the frame by means of flanges 32 bent over on the under side of the frame. The front and back of the frame 26 are joined and braced by a pair of longitudinal braces 34 which rest on, and are secured to, the upper surface of the frame. The longitudinal braces 34 are generally channel-shaped in cross section and are provided with flanges 36 along the upper edges thereof. Extending transversely across the frame 26 is a series of rods 38 which rest upon the ends of the frame 26 and the longitudinal braces 34. The transverse rods 38 are secured to, and spaced by, a series of longitudinal rods 40. The back edge of the frame 26 is arranged to rest on a portion of the riser 22 as indicated at 42 in Figure 2, and the front edge of the frame 26 is provided with a pair of clips 44 which are apertured to fit over a pair of pins 46 in the front of the riser 22. The clips 44 support the front of the cushion and prevent it from being shifted horizontally.

Figure 3:
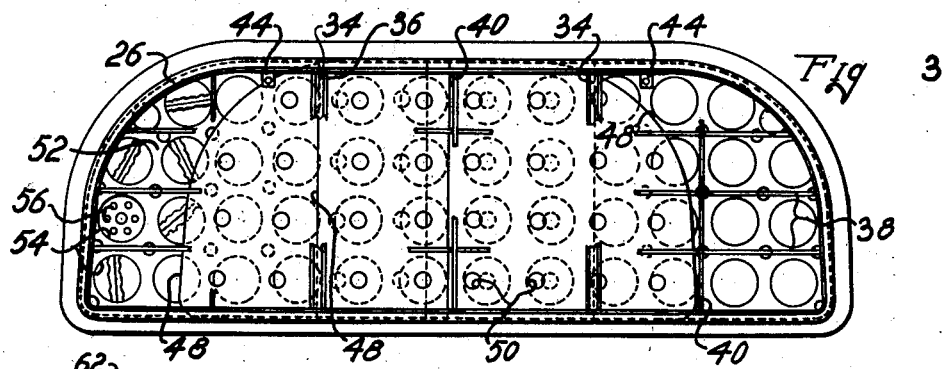
Figure 3 represents a bottom plan view of the cushion shown in Figures 1 and 2.

Supported upon the transverse rods 38 are three panels 48 of wood, metal or stiff fiber construction, which in their extended position overlap each other slightly and completely fill the space within the outline of the frame 26. The panels 48 are provided with a number of holes 50 so that air may pass therethrough. Attention is called to the fact that in Figure 3 the panels 48 are shown to be slid partially over one another so as to uncover the ends of the cushion.

Figure 4:
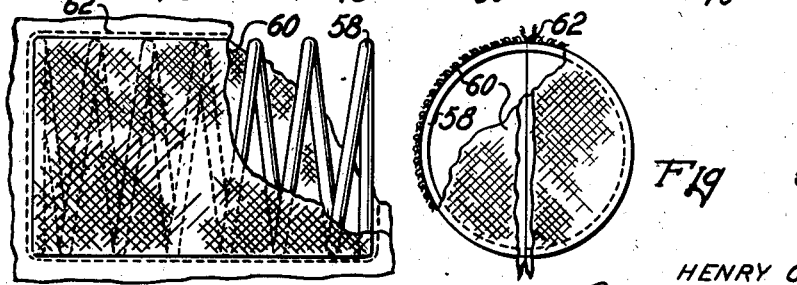
Figure 4 represents a side elevation, partially broken away, of the spring structure shown in Figures 2 and 3.
Figure 5:
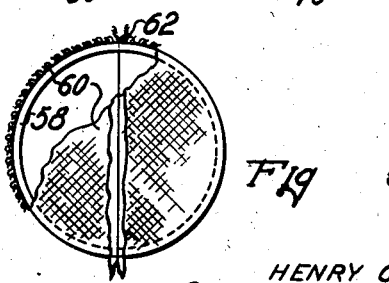
Figure 5 represents an end elevation, partially broken away, of the spring structure shown in Figure 4.

The panels 48 serve to support the sponge rubber pad 52 which is molded or otherwise formed to define a series of pockets 54 which open on the under side of the pad. The upper ends of the pockets 54 are further provided with smaller pockets 56 which soften the pad. Positioned within each of the large pockets 54 is a coil spring 58 which is retained in, and initially compressed by, a cloth cover 60 which is sewn around the spring as is indicated at 62 in Figures 4 and 5. The pad 52 is retained on top of the frame 26 by means of a tie strip 64 which is cemented or otherwise suitably secured around the lower edge of the pad and then stretched over the bottom edge of the frame 26 and tacked to the nailing strip 30. The pad 52 and tie strip may be covered by suitable upholstery drawn over the pad and tacked to the nailing strip.

In this construction it will be seen that the pad 52 retains the coil springs 58 in place, while at the same time padding the upper ends of the coils. The springs 58 take the main load of the person sitting on the cushion, while the pad 52 is soft and resilient so as to conform to the contour of the person's body and distribute his weight evenly over the cushion. If desired, the entire cushion, including the frame and pad, may be removed from the riser 22 and turned upside down, in which position the panels 48 may be slid sideways to uncover any of the pockets 54 and springs 58. The wide spacing of the transverse bars 38 allows the individual springs 58 and their casing 60 to be removed and replaced by a spring of stiffer or weaker action so that the cushion may be easily adjusted in stiffness to suit various users. This feature is highly desirable, particularly to persons who drive or ride a great deal in one automobile and desire a particular stiffness in the cushions of the automobile which may be different than that originally built into the cushions.

Figures 8 through 13 illustrate a modified type of cushion in which the longitudinal brace rods 134 are bent upwardly as at 135 at the forward edge of the frame 26 so that they slope downwardly to the back of the frame. The transverse rods 138 are bent upwardly at the ends as at 139 (see Figures 8 and 10) until they may be passed over the top of the longitudinal braces 134. The transverse rods 138 are also connected by several longitudinal rods 140 which also are raised at the front of the frame and slope downwardly to the back edge of the frame.

Figure 2:
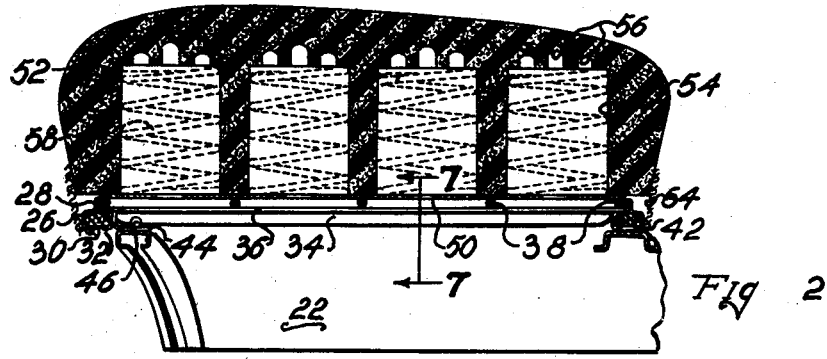
Figure 2 represents a sectional view taken along a plane indicated by the line 2—2 in Figure 1 and looking in the direction of the arrows.

The transverse rods 138 serve to support the same panels 48 as are described in connection with Figures 1 through 7. The panels 48 support a pad 152 which is provided with pockets 154 which retain the coil springs 158. Attention is called to the fact that by raising the front edge of the longitudinal braces 134 and tilting the panels 48, the upper surface of the pad 152 may have the same slope and contour as that shown in Figure 2, while at the same time using a considerably less amount of sponge rubber. The pad 152 is fastened to the frame 26 by the same type of tie strip 64 as is illustrated in Figure 2.

As shown in Figure 11, the pockets 154 are staggered so as to be closer together than the pockets 54 shown in Figure 6. This reduces the amount of rubber in the walls 155 between the pockets and further reduces the weight and cost of the pad. Half round pockets 157 are provided along the edges of the pad to further reduce its cost.

The springs 158 which are positioned in the pockets 154 are different from the springs 58 in that the top of the springs 158 is turned into a flat spiral 159 which rests against the upper end of the pockets 154 and distributes the load in the springs over the end of the pockets. This shape of spring eliminates the necessity of the casing 62 shown in Figures 4 and 5.

The springs 158 may be changed for stiffer or weaker springs in the same manner as the springs 58 in the cushion shown in Figures 1 through 7.

While I have described my invention in some detail, I intend this description to be an example only and not as a limitation of my invention to which I make the following claims:

1. In a cushion, a frame having the general outline of said cushion, rods extending across said frame and supported thereby, flat panels supported on said rods and movable with respect to each other and said rods into overlapping relationship, a sponge rubber pad supported upon said panels and defining a plurality of pockets opening on said panels, and coil springs removably positioned within said pockets, said springs being accessible from below said frame when said panels are moved into overlapping relationship.

2. In a cushion, a frame having the same general outline as said cushion, rods extending across said frame and supported thereby, panels supported on said rods and movable with respect to each other and said rods into overlapping relationship, a sponge rubber pad supported upon said panels and defining a plurality of pockets opening on said panels, coil springs removably positioned within said pockets, and a tie strip secured to the edges of said pad and fastened to said frame, said springs being accessible from below said frame when said panels are moved into overlapping relationship.

3. In a cushion, a frame, a pad supported upon said frame, a plurality of removable coil springs positioned in said pad, and panels positioned between said frame and said pad to retain said springs in place, said panels being slidable over one another to uncover said springs.

4. In an automobile, a seat riser having a generally horizontal top surface, a base supported upon said riser comprising a horizontal frame, bars extending across said frame, said bars being raised at the forward edge of said frame, flat panels freely supported upon said bars and slidable relative thereto, a pad of sponge rubber supported upon said panels, said pad defining a plurality of pockets in the under surface thereof, springs removably positioned in said pockets and freely supported on said panels, and means fastening said pad to said frame.

5. In an automobile seat, a generally rectangular horizontal frame, bars extending across said frame and being raised along the forward edge of said frame, a plurality of flat panels slidably supported upon said bars and covering the entire area within said frame, a pad defining a plurality of pockets on the under side thereof supported upon said panels and having a surface generally parallel to said panels, and coil springs removably positioned within said pockets and arranged to bear against the ends of said pockets and said panels.

6. In a seat, a generally rectangular frame of the same contour as said seat, bars extending from side to side against said frame, a plurality of panels freely supported upon said bars so as to completely cover said frame, said panels overlapping each other slightly and being slidable into overlapping relationship, a pad of sponge rubber defining a plurality of pockets on the under side thereof supported upon said panels, coil springs removably positioned in said pockets and bearing against said panels, and means securing the edges of said pad to said frame, said springs being removable from said pockets and from between said bars when said panels are moved into overlapping relationship.

7. In a seat, a generally rectangular frame, bars extending from side to side of said seat, a cushion formed of sponge rubber supported upon said bars and defining a plurality of pockets opening on the bottom side thereof, said bars extending between said pockets so as to leave the pockets unobstructed, coil springs positioned within said pockets, and a plurality of panels positioned between said bars and said pad, said panels being slidable into overlapping relationship to uncover said pockets.

HENRY C. BORISCH.